May 21, 1935. W. GEIST 2,002,055

POWER TRANSMITTING MECHANISM

Filed May 19, 1930

Inventor
Walter Geist
by
Attorney

Patented May 21, 1935

2,002,055

UNITED STATES PATENT OFFICE 2,002,055

POWER TRANSMITTING MECHANISM

Walter Geist, Milwaukee, Wis., assignor to Allis-Chalmers Manufacturing Company, Milwaukee, Wis., a corporation of Delaware Application March 19, 1930, Serial No. 453,440

10 Claims. (Cl. 74—389)

The present invention relates in general to improvements in the art of power transmission, and relates more specifically to mechanism for transmitting power from one machine to another, operating at different speeds.

An object of the invention is to provide an improved power transmitting mechanism which is simple and compact in construction, and efficient in operation.

It is desirable in certain industries such as the oil industry, to be able to utilize a single power transmission unit for the purpose of alternately operating several machines such as a hoisting drum, or a drilling mechanism, or other apparatus, the driven devices being operable at considerably lower speeds than the prime mover or motor constituting the power source. Such units are ordinarily designated as reduction units, and usually comprise a gear reduction mechanism having driving and driven shafts, the former of which is connected in some manner to the power source and the latter of which is provided with several power take-offs, such as a crank and a sprocket, which are alternately connectible respectively to a sucker rod and a hoisting drum. The prior units of this type have proven objectionable because they are not constructed to properly distribute the forces, because they cannot be readily transported, and also because they are not economical.

It is a more specific object of the present invention to provide various improvements in the details of construction of speed reducing power transmission mechanism especially adapted for uses such as above indicated, and particularly in the oil fields. Another object of the invention is to provide a power transmission mechanism in which the forces are well distributed and wherein shock introduced by the driven elements is not transmitted to the driving machine. A further object of the invention is to provide a double reduction power transmission unit which is rigid in structure and which occupies minimum floor space. Still another object of the invention is to provide a power transmitting unit adapted for alternate uses, which is conveniently accessible during interchangeability and operation, and wherein the frailer parts are protected against damage. A further object of the invention is to provide a double reduction unit utilizing speed reducing gearing and a high speed driving source, wherein the gearing is operable at relatively low speed. A further object of the invention is to provide motor driven speed reduction apparatus which may be transported as a unit, and wherein the degree of speed change may be readily varied. These and other objects and advantages will appear from the following detailed description.

A clear conception of an embodiment of the invention and of the mode of operating devices constructed in accordance therewith, may be had by referring to the drawing accompanying and forming a part of this specification in which like reference characters designate the same or similar parts in the several views.

Figure 1:
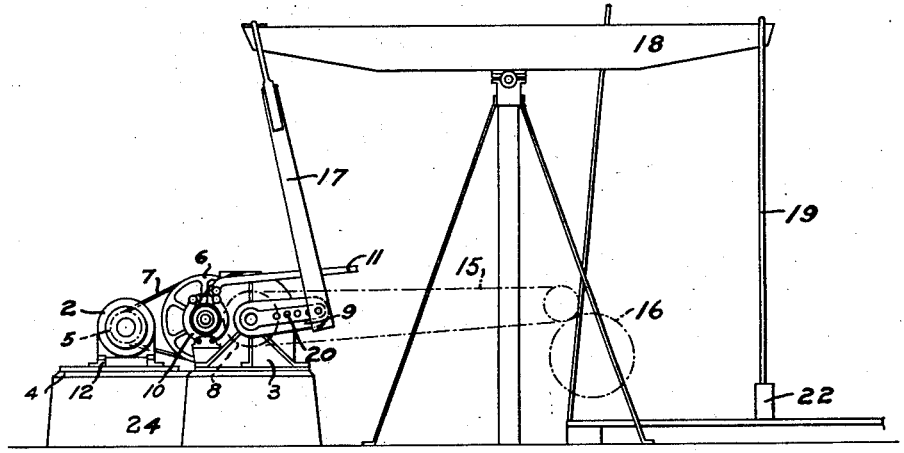
Fig. 1 is a somewhat diagrammatic side elevation of a double reduction power transmitting unit adapted to alternately drive a hoisting drum and a sucker rod such as are customarily employed in the oil fields.
Figure 2:
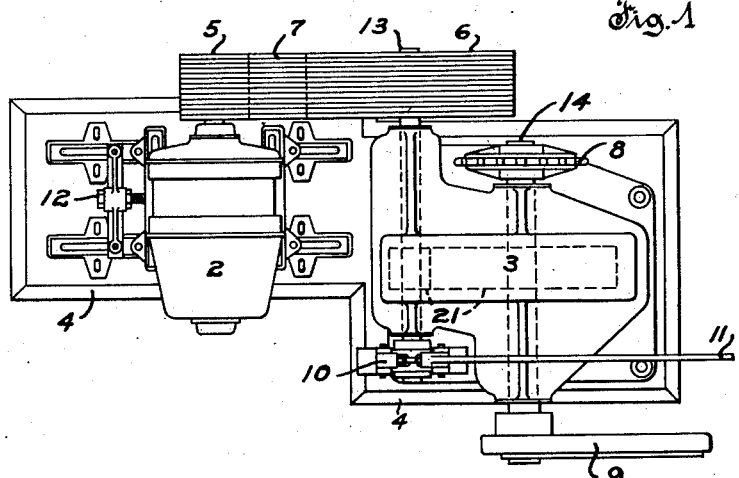
Fig. 2 is an enlarged top view of the improved double reduction power transmitting unit.
Figure 3:
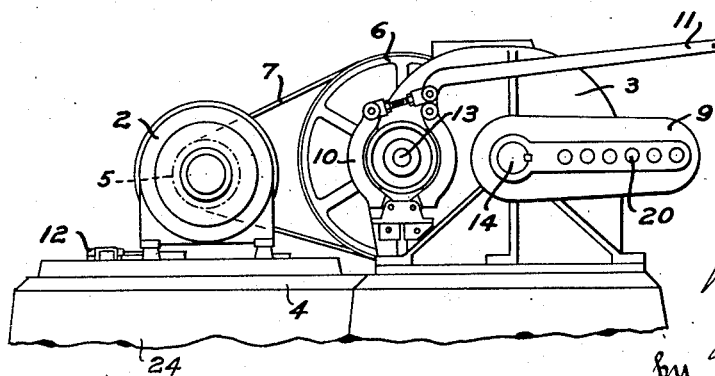
Fig. 3 is a similarly enlarged side elevation of the improved double reduction power transmitting unit.

Referring to the drawing, the improved double reduction power transmission unit comprises in general a prime mover such as an electric motor 2, a gear reduction unit 3, and a flexible driving connection between the motor 2 and the unit 3, all of these elements being mounted upon a common one-piece base 4 which may be detachably supported upon a suitable foundation 24 and attached thereto by means of bolts or the like.

The motor 2 is ordinarily operable at relatively high speed, and is adjustably associated with the base 4 by means of adjusting mechanism 12 comprising a pair of parallel slotted rails and cooperating bolts which permit adjustment of the motor 2, within limits, both laterally and longitudinally of the base 4 and relative to the unit 3.

The gear reduction unit 3 comprises a driving shaft 13 operable at relatively high speed but at considerably lower speed than that of the motor 2, a driven shaft 14 operable at considerably lower speed than the driving shaft 13, speed reducing gearing 21 interconnecting the shafts 13, 14, and a housing supported upon the base 4 and enclosing the gearing 21 and the medial portions of the shafts 13, 14. The shafts 13, 14 are supported in suitable bearings formed integral with the housing, being disposed in substantially the same horizontal plane and having substantially parallel axes of rotation. One of the overhanging ends of the driven shaft 14 carries a variable throw crank 9 which is provided with a series of holes 20 adapted to receive a crank pin at the desired distance from the shaft axis in order to obtain a predetermined crank throw. The crank 9 is revolvable during rotation of the shaft 14, across the adjacent end of the driving shaft 13, and is disposed beyond the edge of the foundation 4 so as to permit unobstructed revolution of the crank 9. The opposite overhanging end of the driven shaft 14 is provided with a power take-off which in the present instance comprises a sprocket wheel 8 adapted to receive a chain 15, the sprocket wheel 8 being located intermediate the ends of the adjacent driving shaft 13. The end of the driving shaft 13 adjacent to the crank 9 is provided with a brake 10 operable by a brake lever 11 to control the speed of the driving shaft 13.

The end of the driving shaft 13 remote from the brake 10, carries a relatively large multiple groove sheave 6. The corresponding end of the shaft of the motor 2 carries a smaller multiple V-grooved sheave 5, the grooves of which may be brought into alinement with the corresponding grooves of the larger sheave 6 by adjusting the motor 2 upon the base 4 with the aid of the adjusting mechanism 12. A plurality of relatively elastic endless V-belts 7 coact with the alined grooves of the sheaves 5, 6 thus providing a flexible driving connection between the motor 2 and the driving shaft 13 of the gear reduction unit 3.

The crank 9 is adapted to be connected to one end of a walking beam 18 by means of a removable pitman 17, and the opposite end of the walking beam may be connected directly to a sucker rod 19 which is reciprocable within the well 22 as illustrated in Fig. 1. The crank 9 is adapted to be disconnected from the pitman 17 and to run idly during such disconnection. The chain 15 coacting with the sprocket wheel 8 may be caused to drive a hoisting drum 16, when the crank 9 is disconnected from the pitman 17. If desired, both the sprocket wheel 8 and the crank 9, may be utilized simultaneously, but the mechanism is ordinarily so designed that the power take-offs at the opposite ends of the driven shaft 14 be utilized interchangeably.

During normal operation of the improved power transmitting mechanism, the motor 2 is being operated to drive the shaft 13 at considerable slower speed than that of the motor, and the driving shaft 13 is functioning to drive the driven shaft 14 through the gearing 21. If the crank 9 is being utilized to operate the sucker rod 19, then the chain 15 may be removed. As the crank 9 revolves, the sucker rod 19 is reciprocated at a predetermined speed. When the pitman 17 is disconnected from the crank 9, the chain 15 may be applied to drive the hoisting drum 16. The brake 10 serves to control the speed of rotation of the shafts 13, 14 and this brake is readily operable during normal operation of the unit without interfering with the delivery of power by either the crank 9 or the sprocket 8.

The provision of a flexible speed reducing driving connection between the motor 2 and the gear unit 3, prevents shock induced by the driven mechanisms, from reaching the driving motor 2. The initial speed reduction afforded by the flexible multiple V-belt drive, moreover eliminates necessity of driving the gearing at the high speed of the motor. By mounting the entire speed reducing mechanism upon a common base 4, the unit may be readily removed from one locality and transported to another without disturbing the relative positions of the elements of the unit. By placing the crank 9 at the end of the driven shaft 14 so that it will clear the corresponding end of the driving shaft 13, and by further locating the flexible V-belt drive on the side of the gear reduction unit 3 remote from the crank 9, an extremely compact arrangement of elements results. The disposition of the sprocket wheel 8 at the inside of the sheave 6, permits convenient removal of the sheaves 5, 6 and replacement thereof by other sheaves providing different speed ratios, thereby permitting convenient variation in the speed of the driven elements. The disposition of the sheave 6 beyond the adjacent end of the driven shaft 14, also permits the use of a sheave 6 having a radius greater than the distance from the axis of the driving shaft 13 to the periphery of the driven shaft 14, without interference. This would not be permissible if the sheave 6 were attached to the opposite end of the driving shaft 13, since a sheave 6 having such a large diameter would obviously interfere with either the crank 9 or with the driven shaft 14. This is an important feature of the present invention, and enables the use of a standard gear reduction unit 3 while permitting extreme variations in the speed ratios between the motor and the driven shaft 13 of the unit 3.

From the foregoing discussion it will be noted that the present invention in fact provides various improvements in the details of construction of speed reducing power transmission mechanisms of the type especially adapted for use in the oil fields, and the practicability of this invention has been proven by the successful operation of numerous units embodying the improvement.

It should be understood that it is not desired to limit the invention to the exact details of construction and to the precise mode of operating units herein shown and described, for various modifications within the scope of the claims may occur to persons skilled in the art.

It is claimed and desired to secure by Letters Patent:

1. In combination, a speed-reducing mechanism, comprising substantially parallel driving and driven shafts, cooperative power transmitting elements carried by intermediate portions of said shafts, a housing for said cooperative power elements, the bearings for said driven shaft being carried by said housing, a crank carried by an end portion of said driven shaft extending from said housing and movable past the corresponding end of said driving shaft, a source of mechanical power, a driving connection between said power source and said driving shaft comprising a rotary element carried by a portion of said driving shaft extending beyond said housing at the end opposite to said crank and disposed at a point axially outside of the corresponding end of said driven shaft, the end of said driven shaft and a power take-off device carried by an end portion of said driven shaft opposite to that carrying said crank being disposed outside of said housing.

2. In combination, a speed-reducing mechanism, comprising substantially parallel driving and driven shafts, cooperative power transmitting elements carried by intermediate portions of said shafts, a housing for said cooperative power transmitting elements, the bearings for said driving and driven shafts being carried by said housing, a crank carried by one end of said driven shaft extending from said housing and movable past the corresponding end of said driving shaft, the portion of said housing carrying the bearing for the end of said driven shaft opposite to said crank terminating axially inside the portion of said housing carrying the bearing for the corresponding end of said driving shaft, a source of mechanical power, and a driving connection between said power source and said driving shaft comprising a rotary element carried by a portion of said driving shaft extending beyond said housing at the end opposite to said crank, said rotary element being disposed axially outside of the corresponding end of said driven shaft.

3. In combination, a speed-reducing mechanism, comprising substantially parallel driving and driven shafts, cooperative power transmitting elements carried by intermediate portions of said shafts, a housing for said cooperative power transmitting elements, the bearings for said driving and driven shafts being carried by said housing, a crank carried by one end of said driven shaft extending from said housing and movable past the corresponding end of said driving shaft, a source of mechanical power, a driving connection between said power source and said driving shaft comprising a rotary element carried by a portion of said driving shaft extending beyond said housing at the end opposite to said crank, and a power take-off comprising a rotary member carried by an end portion of said driven shaft opposite to that carrying said crank and disposed outside of said housing at a point axially inside of said rotary element carried by said driving shaft.

4. In combination, a speed-reducing mechanism, comprising substantially parallel driving and driven shafts, cooperative power transmitting elements carried by intermediate portions of said shafts, a housing for said cooperative power transmitting elements, the bearings for said driving and driven shafts being carried by said housing, a crank carried by one end of said driven shaft extending from said housing, a brake including a rotary element carried by the corresponding end portion of the driving shaft extending from said housing, said crank being movable past said rotary brake element and the corresponding end of said driving shaft, a motor, a driving connection between said motor and said driving shaft comprising a rotary element carried by a portion of said driving shaft extending beyond said housing at the end opposite to said crank, and a power take-off comprising a rotary member carried by an end portion of said driven shaft opposite to that carrying said crank and outside of said housing at a point axially inside of said rotary element carried by said driving shaft.

5. In combination, a speed-reducing mechanism, comprising substantially parallel driving and driven shafts, cooperative power transmitting elements carried by intermediate portions of said shafts, a housing for said cooperative power transmitting elements, the bearings for said driving and driven shafts being carried by said housing, a crank carried by one end of said driven shaft extending from said housing and movable past the corresponding end of said driving shaft, a motor, a driving connection between said motor and said driving shaft comprising a rotary element carried by a portion of said driving shaft extending beyond said housing at the end opposite to said crank, said rotary element being mounted on said driving shaft immediately adjacent the shaft bearing portion of said housing, and a power take-off comprising a rotary member carried by the end portion of said driven shaft opposite to that carrying said crank and mounted immediately adjacent the shaft bearing portion of said housing, said rotary member being disposed axially inside said rotary element carried by said driving shaft.

6. In combination, a speed-reducing mechanism, comprising substantially parallel driving and driven shafts, cooperative power transmitting elements carried by intermediate portions of said shafts, a housing for said cooperative power transmitting elements, the bearings for said driving and driven shafts being carried by said housing, a crank carried by one end of said driven shaft and mounted thereon immediately outside of the shaft bearing portion of said housing, a brake including a rotary element carried by the corresponding end portion of said driving shaft extending from said housing, said rotary brake element being disposed axially inside the outer end of the bearing for the corresponding end of said driven shaft, a motor, a driving connection between said motor and said driving shaft comprising a power transmitting wheel carried by a portion of said driving shaft extending beyond said housing at the end opposite said rotary brake element, said wheel being mounted on said driving shaft immediately adjacent the shaft bearing portion of said housing, and a power take-off comprising a rotary member carried by the end portion of said driven shaft opposite to that carrying said crank and mounted immediately adjacent the shaft bearing portion of said housing, said rotary member being disposed axially inside said wheel carried by said driving shaft, and the axially outer side of the bearing for the end of said driven shaft carrying said rotary member being disposed axially inside of the axially outer side of the bearing for the corresponding end of said driving shaft.

7. In a power transmission apparatus for well pumping, a driving motor, a speed reduction unit comprising substantially parallel driving and driven shafts and a power transmitting connection between said shafts, a housing supporting said shafts and enclosing said power transmitting connection, the ends of said driven shaft extending beyond said housing, a rotatable element carried by one of said extending end portions of the driven shaft and movable thereby past the corresponding end of said driving shaft, that portion of the housing supporting the end portion of said driven shaft remote from said rotatable element terminating axially inside that portion of said housing which supports the corresponding end portion of said driving shaft, a driving connection between said motor and said last mentioned end portion of said driving shaft at a point thereof beyond said housing, said driving connection including a rotatable element mounted on said latter extending end portion of said driving shaft and having a portion rotatable past the corresponding end of said driven shaft.

8. In a power transmission apparatus for well pumping, a driving motor, a speed reduction unit comprising substantially parallel driving and driven shafts and a power transmitting connection between said shafts, a housing providing bearing supports for said shafts and enclosing said power transmitting connection, the ends of said driven shaft extending beyond said housing, a crank carried by one of said extending end portions of the driven shaft and movable thereby past the corresponding end of said driving shaft, a driving connection between said motor and a portion of said driving shaft at the opposite end thereof extending beyond said housing, said driving connection including a rotatable element mounted on said extending end portion of said driving shaft, and a power take-off device on the extending end portion of said driven shaft opposite to the crank end thereof and disposed axially inside of the outer end of the bearing support for the corresponding end of the driving shaft.

9. In combination in a power transmission device for oil well pumping, a driving motor, a speed reducing unit comprising driving and driven shafts, and a power connection between said shafts, a unitary casing enclosing said power connection between said shafts and supported in position independently of said motor, bearings for said shafts carried by said casing, a crank outside of said casing and mounted on an extending portion of said driven shaft and movable past the corresponding end of said driving shaft, a driving connection between said motor and said driving shaft and including a pulley outside of said casing and mounted on an extending end of said driving shaft opposite to the crank end of said driven shaft, and a power take-off device on an extending end portion of said driven shaft opposite to the crank end thereof and disposed axially inside of the outer end of the bearing for the corresponding end of the driving shaft.

10. In combination in a power transmission device for oil well pumping, a driving motor, a speed reducing unit comprising driving and driven shafts, and a power connection between said shafts, a unitary casing enclosing said power connection between said shafts and supported in position independently of said motor, bearings for said shafts carried by said casing, a crank outside of said casing and mounted on an extending end portion of said driven shaft and movable past the corresponding end of said driving shaft, a driving connection between said motor and said driving shaft and including a pulley outside of said casing and mounted on an extending end of said driving shaft opposite to the crank end of said driven shaft, a power take-off device on an extending end portion of said driven shaft opposite to the crank end thereof and disposed axially inside of the outer end of the bearing for the corresponding end of the driving shaft, and a braking device outside of said casing and mounted on an extending end portion of said driving shaft corresponding to the crank end of said driven shaft, said braking device being disposed axially inside of the outer end of the portion of said casing which provides a bearing for the crank end of said driven shaft.

WALTER GEIST.